US011108586B2

(12) United States Patent
Seol (10) Patent No.: US 11,108,586 B2
(45) Date of Patent: Aug. 31, 2021

(54) INFOTAINMENT APPARATUS OF VEHICLE, AND CONTROL METHOD FOR THE SAME (71) Applicants: Hyundai Motor Company, Seoul (KR); Kia Motors Corporation, Seoul (KR)

(72) Inventor: Unhwan Seol, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/588,494

(22) Filed: Sep. 30, 2019

(65) Prior Publication Data
US 2020/0322179 A1 Oct. 8, 2020

(30) Foreign Application Priority Data

Apr. 4, 2019 (KR) .......................... 10-2019-0039510

(51) Int. Cl.
*H04L 12/28* (2006.01)
*G06F 3/0481* (2013.01)
*G06F 3/0484* (2013.01)
*B60K 35/00* (2006.01)

(52) U.S. Cl.
CPC .......... *H04L 12/2818* (2013.01); *B60K 35/00* (2013.01); *G06F 3/04815* (2013.01); *G06F 3/04817* (2013.01); *G06F 3/04842* (2013.01); *H04L 12/2825* (2013.01); *H04L 2012/285* (2013.01)

(58) Field of Classification Search
CPC ............. G06F 3/04815; G06F 3/04817; G06F 3/04842; B60K 35/00
See application file for complete search history.

(56) References Cited

U.S. PATENT DOCUMENTS

| | | | |
|---|---|---|---|
| 2014/0002359 A1* | 1/2014 | Weising | A63F 13/65 345/158 |
| 2015/0358777 A1* | 12/2015 | Gupta | H04L 67/18 370/254 |
| 2016/0173293 A1* | 6/2016 | Kennedy | H04L 12/2814 709/222 |
| 2017/0134553 A1* | 5/2017 | Jeon | H04W 76/10 |
| 2020/0005542 A1* | 1/2020 | Kocharlakota | G06F 3/147 |
| 2020/0099748 A1* | 3/2020 | Cambridge | H04L 63/123 |
| 2020/0104433 A1* | 4/2020 | Santarone | G01S 5/0247 |
| 2020/0204649 A1* | 6/2020 | Fowe | G06T 19/006 |

* cited by examiner

*Primary Examiner* — Sang H Kim
(74) *Attorney, Agent, or Firm* — Morgan, Lewis & Bockius LLP

(57) ABSTRACT

An infotainment apparatus of a vehicle includes: a communication device configured to receive relative location information of an Internet of Things (IoT) device included in a predetermined space from an external device; a controller configured to generate a virtual space based on the relative location information of the IoT device, generate an icon of the IoT device, dispose the icon of the IoT device in the virtual space, generate a Graphic User Interface (GUI) of the virtual space in which the icon of the IoT device is located; and a display configured to display the GUI of the virtual space.

14 Claims, 11 Drawing Sheets

INFOTAINMENT APPARATUS OF VEHICLE, AND CONTROL METHOD FOR THE SAME

CROSS-REFERENCE TO RELATED APPLICATION

This application claims priority to and the benefit of Korean Patent Application No. 10-2019-0039510, filed on Apr. 4, 2019 in the Korean Intellectual Property Office, the disclosure of which is incorporated in its entirety by reference.

TECHNICAL FIELD

The present disclosure relates to an infotainment apparatus of a vehicle capable of interlocking with an Internet of Things (IoT) device and a control method thereof.

BACKGROUND

An infotainment system is an integrated system of information representing necessary information such as driving and driving guidance, and entertainment representing various entertainment and human-friendly functions.

A technology for controlling Internet of Things (IoT) devices in a home space using an infotainment apparatus of a vehicle is also emerging. However, the software of a vehicle infotainment apparatus (software related to user experience (UX) and user interface (UI)) has not yet satisfied user needs.

That is, the conventional infotainment apparatus is provided a user interface without considering the user's convenience. In addition, the conventional infotainment apparatus has an unintuitive display of information which makes it difficult to identify changes in infotainment function status.

SUMMARY

An aspect of the present disclosure provides a vehicle infotainment apparatus and a control method thereof aim to generate a virtual space similar to a real space in which Internet of Things (IoT) devices are disposed, and generate and display a Graphic User Interface (GUI) of the virtual space on a display.

In accordance with an aspect of the present disclosure, an infotainment apparatus of a vehicle includes: a communication device configured to receive relative location information of an Internet of Things (IoT) device included in a predetermined space from an external device; a controller configured to generate a virtual space based on the relative location information of the IoT device, generate an icon of the IoT device, dispose the icon of the IoT device in the virtual space, generate a Graphic User Interface (GUI) of the virtual space in which the icon of the IoT device is located; and a display configured to display the GUI of the virtual space.

The controller is configured to receive the relative location information of the IoT device including three dimensional coordinates through the communication device.

The controller is configured to generate the virtual space based on the relative location information of the IoT device, predetermined size data of the IoT device and predetermined gap data.

The controller is configured to generate the virtual space based on relative location information of the IoT device located at the outermost side when there are a plurality of IoT devices.

The controller is configured to generate at least one of the virtual space and the icon of the IoT device as a three dimensional image or a two dimensional image.

When a user's input for selecting the icon of the IoT device is detected, the controller is configured to control the display to display a menu related to the operation of the selected IoT device.

The controller is configured to control the communication device to transmit a control signal corresponding to the input of the user to the IoT device when the input of the user for controlling the operation of the IoT device is detected.

The controller is configured to generate a GUI of a plurality of virtual spaces corresponding to a plurality of spaces.

The controller is configured to control the display to selectively display the GUI of the plurality of virtual spaces in response to a user input.

The controller is configured to generate an icon of the IoT device based on the actual image of the IoT device.

In accordance with another aspect of the present disclosure, a control method of an infotainment apparatus of a vehicle includes: receiving relative location information of an Internet of Things (IoT) device included in a predetermined space from an external device; generating a virtual space based on the relative location information of the IoT device; generating an icon of the IoT device; placing the icon of the IoT device in the virtual space and generating a Graphic User Interface (GUI) of the virtual space in which the icon of the IoT device is located; and displaying the GUI of the virtual space on a display.

The receiving relative location information of the IoT device includes receiving the relative location information of the IoT device including three dimensional coordinates.

The generating the virtual space includes generating the virtual space based on the relative location information of the IoT device, predetermined size data of the IoT device and predetermined gap data.

The generating the virtual space includes generating the virtual space based on relative location information of the IoT device located at the outermost side when there are a plurality of IoT devices.

The generating the virtual space includes generating the virtual space as a three dimensional image or a two dimensional image, wherein the generating the icon of the IoT device includes generating the icon of the IoT device as a three dimensional image or a two dimensional image.

The control method further includes, when a user's input for selecting the icon of the IoT device is detected, displaying a menu related to the operation of the selected IoT device on the display.

The control method further includes transmitting a control signal corresponding to the input of the user to the IoT device when the input of the user for controlling the operation of the IoT device is detected.

The generating the GUI of the virtual space includes generating a GUI of a plurality of virtual spaces corresponding to a plurality of spaces.

The control method further includes selectively displaying the GUI of the plurality of virtual spaces in response to a user's input on the display.

The generating the icon of the IoT device includes generating the icon of the IoT device based on the actual image of the IoT device.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. The terms may refer to an electrical circuit, and may also mean at least one hardware, at least one software stored in a memory, or at least one process processed by a processor.

An identification code is used for the convenience of the description but is not intended to illustrate the order of each step. Each of the steps may be implemented in an order different from the illustrated order unless the context clearly indicates otherwise.

Hereinafter, embodiments of a vehicle and a method of controlling the vehicle according to an aspect will be described in detail with reference to the accompanying drawings.

Figure 1:
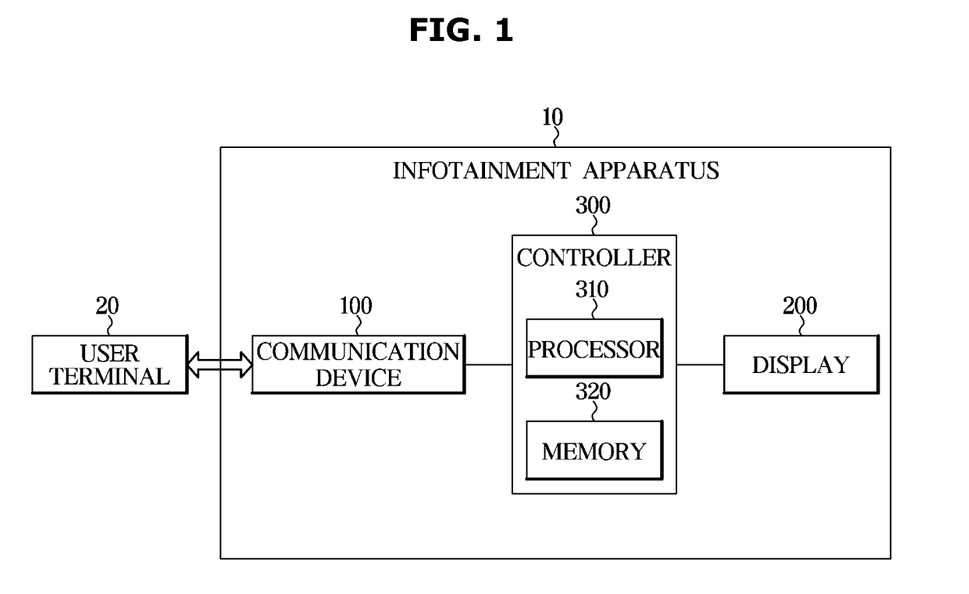
FIG. 1 illustrates a configuration of an infotainment apparatus of a vehicle according to an exemplary embodiment of the present disclosure.

FIG. 1 illustrates a configuration of an infotainment apparatus of a vehicle according to an exemplary embodiment of the present disclosure.

Referring to FIG. 1, an infotainment apparatus 10 of a vehicle may include a communication device 100, a display 200, and a controller 300.

The communication device 100 may transmit and receive data with an external device. The external device may mean the user terminal 20. The user terminal 20 may mean a portable terminal such as a smartphone or a tablet device. The communication device 100 may be a communication circuit to which various communication technologies are applied. The communication device 100 may receive the data from the external device by using wireless communication technologies such as Wi-Fi, wireless local area network (WLAN), ultra-mobile broadband (UMB), GPS, long term evolution (LTE), and 5G mobile communication.

The communication device 100 may be controlled by the controller 300. The communication device 100 may receive relative location information of Internet of Things (IoT) devices 31, 32, 33 (see FIG. 2) included in a predetermined space from an external device. When there are a plurality of IoT devices 31, 32, 33 in a certain space, the plurality of IoT devices 31, 32, 33 form a network, and may be connected to the vehicle's infotainment apparatus 10 by a wireless network.

The communication device 100 may further receive ID, category, etc. of the IoT devices 31, 32, 33.

The display 200 may display various graphic user interfaces related to the operation of the vehicle. In addition, the display 200 may display a GUI (Graphical User Interface) related to the operation of the IoT devices 31, 32, 33 under the control of the controller 300.

The display 200 may include a touch panel. The display 200 including the touch panel may convert a user's touch input into an electrical signal and transmit the converted electrical signal to the controller 300. The controller 300 may process an electrical signal according to a user's touch input and operate the infotainment apparatus 10 of the vehicle corresponding thereto.

The infotainment apparatus 10 of the vehicle may be connected to various user interface devices (not shown) provided in the vehicle. For example, the infotainment apparatus 10 of the vehicle may be connected to a plurality of buttons provided on the steering wheel, the center fascia, and the head unit of the vehicle, and may also be connected to a jog dial, a touch pad, and the like. In addition, the infotainment apparatus 10 of the vehicle may include a speaker or may be connected to a speaker provided in the vehicle.

The display 200 may include a light emitting diode (LED) panel, an organic light emitting diode (OLED) panel, a liquid crystal display panel, or the like.

The controller 300 may include at least one processor 310 for executing a program related to the operation of the infotainment apparatus 10 of the vehicle and at least one memory 320 in which the program is stored. The memory 320 and the processor 310 included in the controller 300 may be integrated on one chip, or may be physically separated.

The memory 320 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these.

Figure 2:
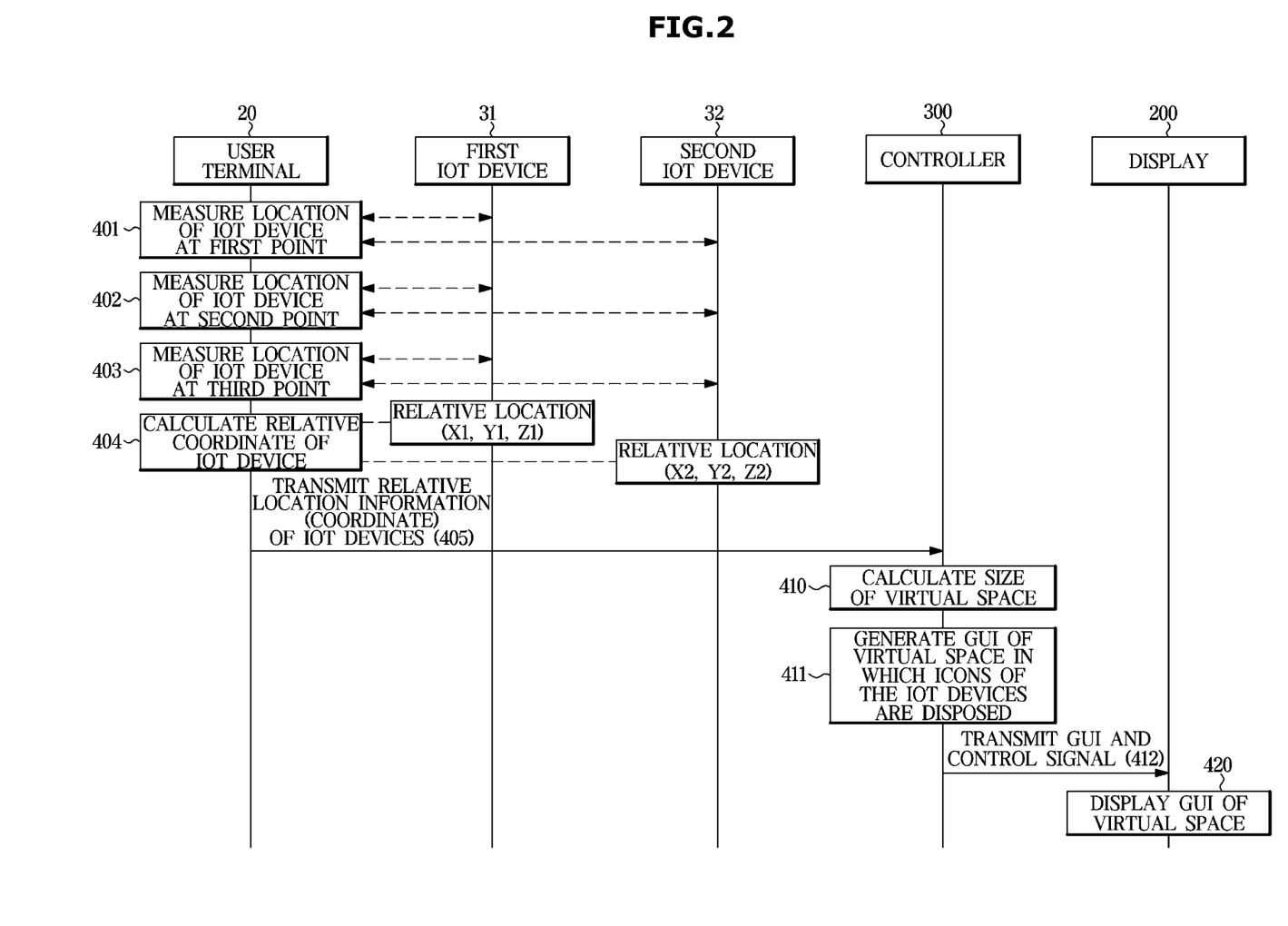
FIG. 2 is a flowchart illustrating a control method of an infotainment apparatus of a vehicle according to an exemplary embodiment of the present disclosure.
Figure 3:
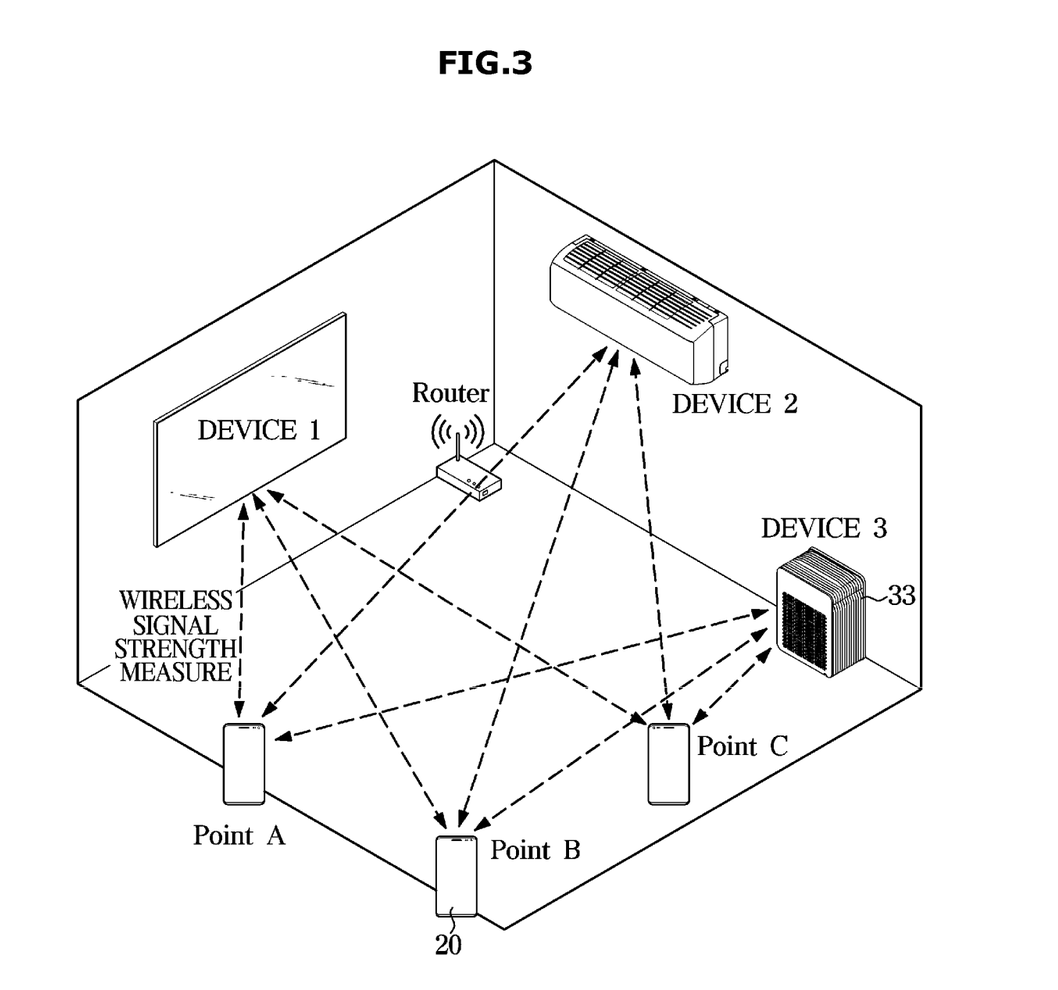
FIG. 3 illustrates a method of obtaining relative location information of an Internet of Things (IoT) device.

FIG. 2 is a flowchart illustrating a control method of an infotainment apparatus of a vehicle according to an exemplary embodiment of the present disclosure. FIG. 3 illustrates a method of obtaining relative location information of an IoT device.

Referring to FIG. 2, the controller 300 may obtain relative location information of the IoT devices 31, 32, 33 included in a predetermined space from the user terminal 20, which is an external device, through the communication device 100. The relative location information of the IoT devices 31, 32, 33 may include three dimensional coordinates. For example, the relative location information of the first IoT device 31 may be (X1, Y1, Z1), and the relative location information of the second IoT device 32 may be (X2, Y2, Z2).

Relative location information of the IoT devices 31, 32, 33 may be calculated based on a location measuring method such as a triangulation method. In detail, the user terminal 20, which is an external device, may measure the location of the IoT devices 31, 32, 33 at a plurality of points. The user terminal 20 measures the strength of wireless signals transmitted and received with the IoT devices 31, 32, 33 at a plurality of points, and measures location of the IoT devices 31, 32, 33 based on the strengths of the wireless signals measured at the plurality of points.

Referring to FIG. 3, the user terminal 20 measures the strength of a wireless signal transmitted/received with the first IoT device 31 at a first point (Point A) and calculates first coordinates Xa, Ya, Za based on the first point (Point A) based on the strength of the wireless signal (401). The user terminal 20 measures the strength of a wireless signal transmitted/received with the first IoT device 31 at a second point (Point B) and calculates second coordinates Xb, Yb, Zb based on the second point (Point B) based on the strength of the wireless signal (402). In addition, the user terminal 20 measures the strength of a wireless signal transmitted/received with the first IoT device 31 at a third point (Point C) and calculates third coordinates Xc, Yc, Zc based on the third point (Point C) based on the strength of the wireless signal (403).

The user terminal 20 may determine an average value of the first coordinates Xa, Ya, Za, the second coordinates Xb, Yb, Zb, and the third coordinates Xc, Yc, Zc as a relative origin coordinate (0, 0, 0), and may calculate the relative coordinates X1, Y1, Z1 of the first IoT device 31 based on the relative origin coordinate (0, 0, 0) (404). In addition, the user terminal 20 may calculate the relative coordinates X2, Y2, Z2 of the second IoT device 32.

The relative coordinates of these IoT devices 31, 32, 33 may be transmitted to the infotainment apparatus 10 of the vehicle (405). That is, the controller 300 may obtain relative coordinates of the IoT devices 31, 32, 33 from the user terminal 20, which is an external device, through the communication device 100.

The controller 300 may generate a virtual space based on the relative location information of the IoT devices 31, 32, 33. Specifically, the controller may calculate a size of the virtual space based on the relative location information of the IoT devices 31, 32, 33, the size data of the predetermined IoT devices 31, 32, 33 and the predetermined gap data and may generate the virtual space (410). In addition, the controller 300 may generate an icon of the IoT devices 31, 32, 33, and may dispose the icon of the IoT devices 31, 32, 33 in a virtual space. The controller 300 may generate a graphical user interface (GUI) of a virtual space in which icons of the IoT devices 31, 32, 33 are disposed (411).

The controller 300 may transmit the generated GUI of the virtual space to the display 200 (412), and control the display 200 to display the GUI of the virtual space (420).

Figure 4:
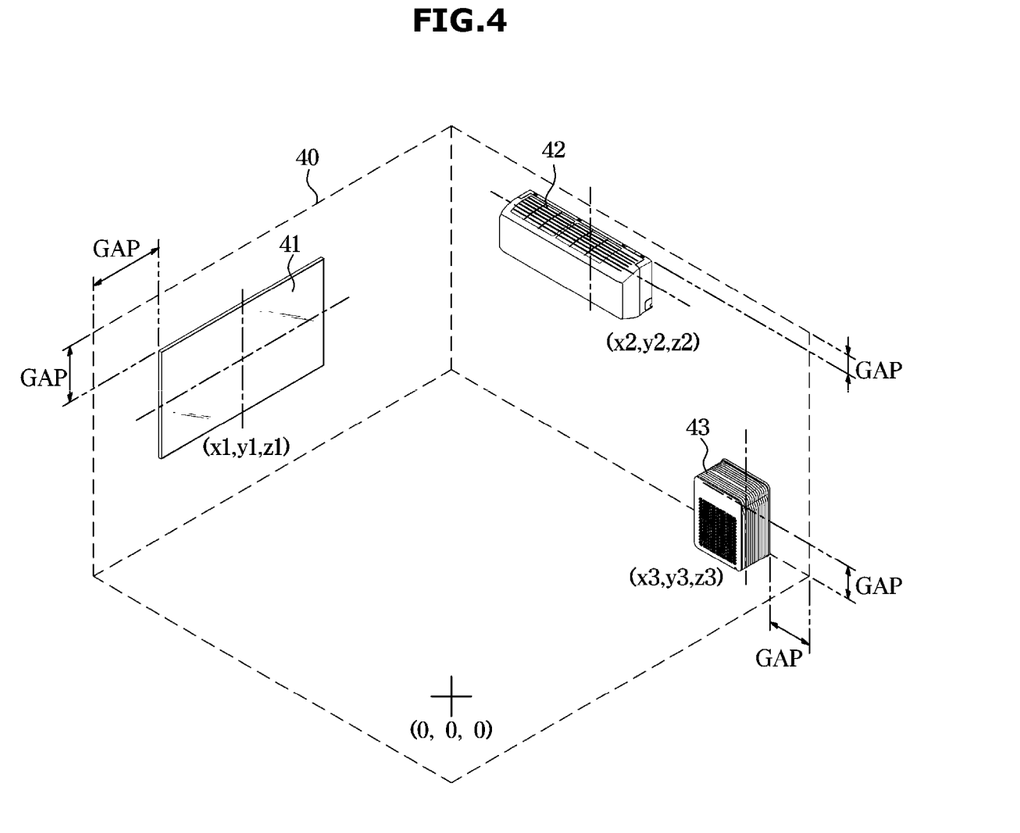
FIG. 4 illustrates a three dimensional virtual space in which icons of IoT devices are disposed.

FIG. 4 illustrates a three dimensional virtual space in which icons of IoT devices are disposed.

Referring to FIG. 4, the controller 300 may generate a virtual space 40 and dispose icons 41, 42, 43 of the IoT device in the virtual space 40. Specifically, the controller may calculate a size of the virtual space based on the relative location information of the IoT devices 31, 32, 33, the size data of the predetermined IoT devices 31, 32, 33 and the predetermined gap data and may generate the virtual space.

The controller 300 may generate the virtual space 40 based on the relative location information of the IoT devices 31, 32, 33 located at the outermost side. The controller 300 may detect the IoT devices 31, 32, 33 located at the outermost side based on the relative coordinates of the IoT devices 31, 32, 33. The controller 300 may determine the IoT devices 31, 32, 33 located at the farthest distance from the relative origin as the IoT devices located at the outermost side.

For example, in FIG. 4, the icon 42 of the second IoT device 32 is shown as being located at the outermost side. Since the relative coordinates X2, Y2, Z2 of the second IoT device 32 are located at the farthest distance from the relative origin (0, 0, 0), the controller may calculate a size of the virtual space 40 based on the relative coordinates X2, Y2, Z2 of the second IoT device 32, the size data of the predetermined second IoT device 32 and the predetermined gap data and may generate the virtual space 40

The relative coordinates X2, Y2, Z2 of the second IoT device 32 are one point representing the second IoT device 32. Therefore, in order to generate the virtual space 40 similar to the real space, size data of the second IoT device 32 and gap data are required.

The size data of the IoT devices 31, 32, 33 may be determined differently according to the category of the IoT devices 31, 32, 33. For example, the first IoT device 31 may be a TV, the second IoT device 32 may be an air conditioner, and the third IoT device 33 may be an air purifier. That is, size data corresponding to each of the TV, the air conditioner, and the air purifier may be stored in the memory 320 in advance.

The gap refers to a separation distance between an outer line of the virtual space 40 and an edge line of an icon (e.g., the icon 42 of the second IoT device 32) of the IoT device located at the outermost side. The gap data may be set to a constant value and may be stored in the memory 320 in advance.

The controller 300 may generate at least one of the virtual space 40 and the icons 41, 42, 43 of the IoT device as a three dimensional image. In FIG. 4, the virtual space 40 is generated as a three dimensional image, and the icon 41 of the first IoT device and the icon 42 of the second IoT device are generated as two dimensional image.

Figure 5:
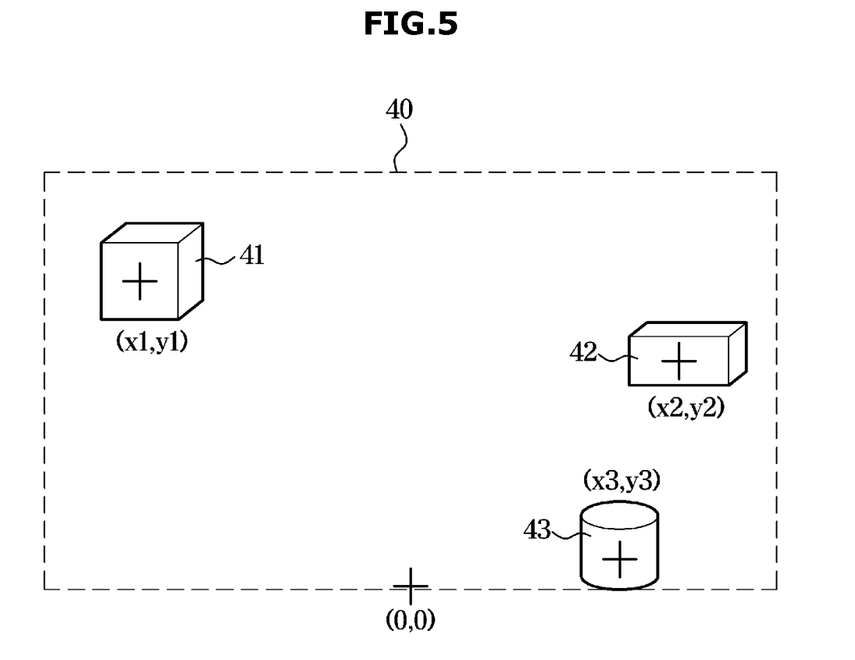
FIG. 5 illustrates a two dimensional virtual space in which icons of IoT devices are disposed.

FIG. 5 illustrates a two dimensional virtual space in which icons of IoT devices are disposed.

Referring to FIG. 5, the controller 300 may generate at least one of the virtual space 40 and the icons 41, 42, 43 of the IoT device as a two dimensional image. In FIG. 5, the virtual space 40 is generated as a two dimensional image, and the icon 41 of the first IoT device, the icon 42 of the second IoT device, and the icon 43 of the third IoT device are generated as a three dimensional image.

The controller 300 may convert three dimensional relative coordinates of the IoT devices 31, 32, 33 into two dimensional relative coordinates. The controller 300 may generate the virtual space 40 of the two dimensional image based on the converted two dimensional relative coordinates of the IoT devices 31, 32, 33, size data of the predetermined IoT devices 31, 32, 33, and predetermined gap data.

Figure 6:
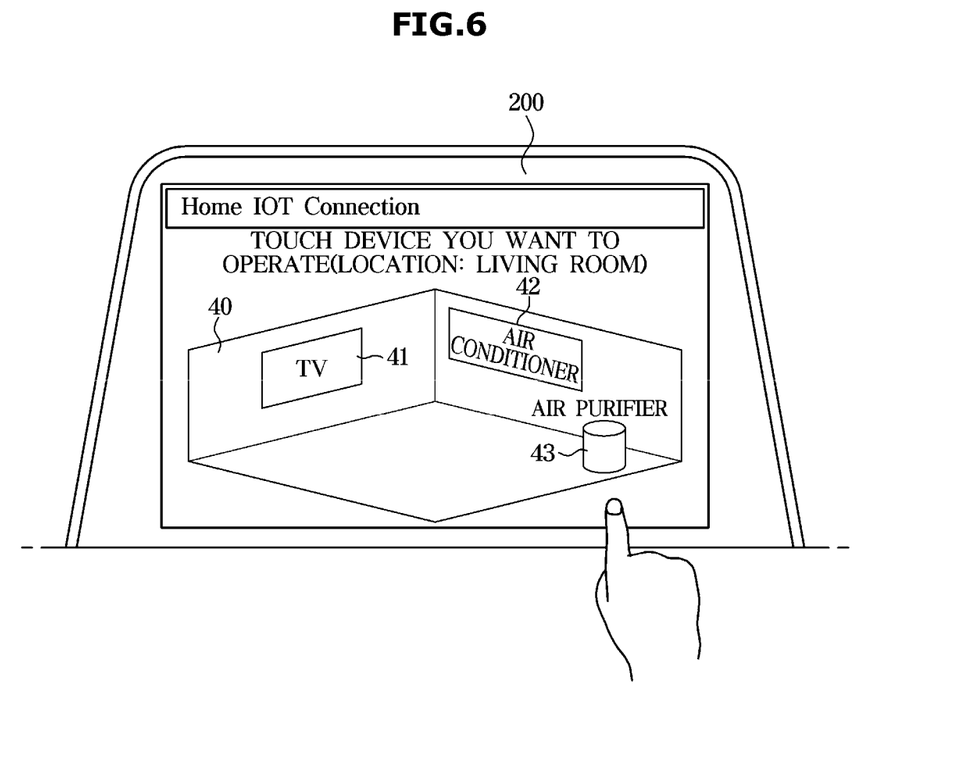
FIG. 6 shows a first embodiment in which a Graphical User Interface (GUI) of a virtual space is displayed on a display.
Figure 7:
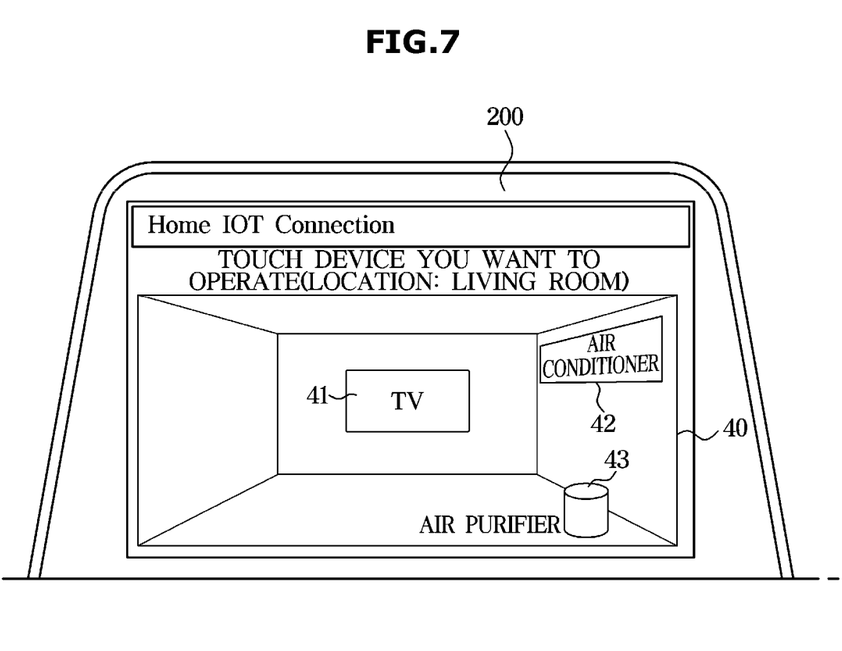
FIG. 7 shows a second embodiment in which a GUI of a virtual space is displayed on a display.
Figure 8:
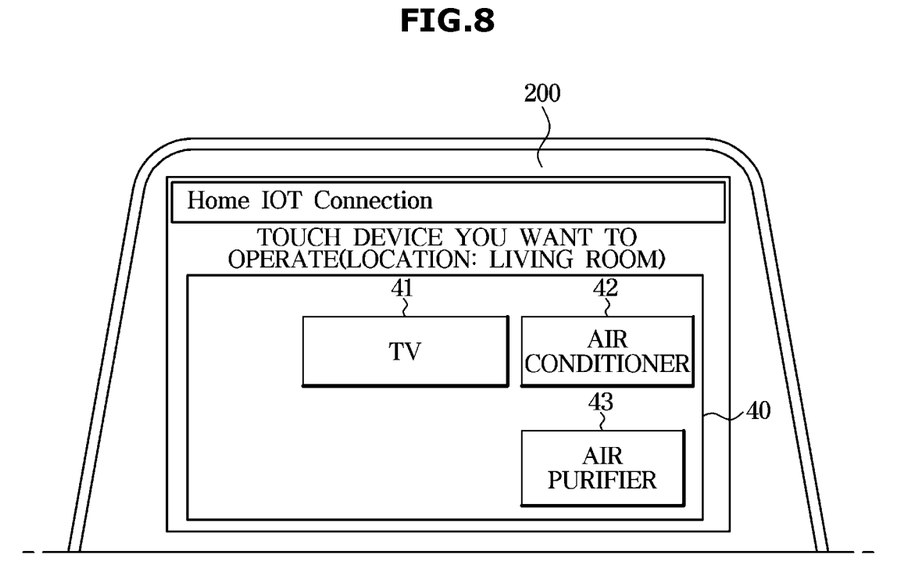
FIG. 8 shows a third embodiment in which a GUI of a virtual space is displayed on a display.

FIG. 6 shows a first exemplary embodiment in which a GUI of a virtual space is displayed on a display. FIG. 7 shows a second exemplary embodiment in which a GUI of a virtual space is displayed on a display. FIG. 8 shows a third exemplary embodiment in which a GUI of a virtual space is displayed on a display.

Referring to FIG. 6, the controller 300 of the infotainment apparatus 10 of the vehicle may control the display 200 to display the three dimensional image of the virtual space 40 in which icons 41, 42, 43 of the plurality of IoT devices are disposed. In FIG. 6, the display 200 displays the corners of the virtual space 40 generated as a three dimensional image in the center, and displays the icons 41, 42, 43 of the plurality of IoT devices around the corners of the virtual space 40.

On the other hand, when the users input for selecting the icons 41, 42, 43 of the IoT device is detected, the controller 300 may control the display 200 to display a menu 200 related to the operation of the selected IoT device 31, 32, 33. As described above, the display 200 may include a touch panel to detect a user's touch input.

Referring to FIG. 7, the display 200 displays one surface of the virtual space 40 generated as a three dimensional image in the center, and displays the icons 41, 42, 43 of the plurality of IoT devices around the one surface of the virtual space 40.

Referring to FIG. 8, the display 200 of the infotainment apparatus 10 of the vehicle displays a two dimensional image of the virtual space 40 in which icons 41, 42, 43 of a plurality of IoT devices are disposed.

Figure 9:
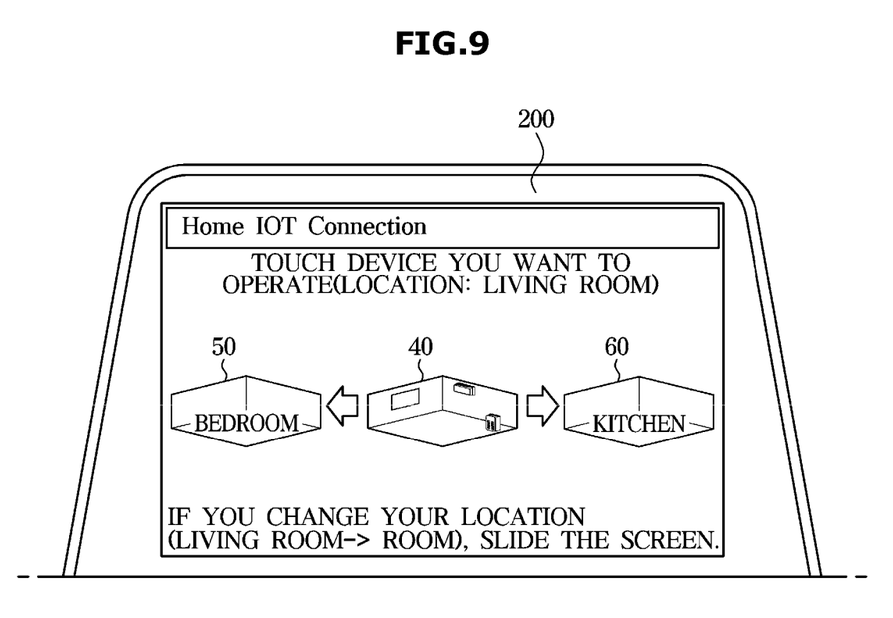
FIG. 9 illustrates that GUIs of a plurality of virtual spaces are selectively displayed.

FIG. 9 illustrates that GUIs of a plurality of virtual spaces are selectively displayed.

Referring to FIG. 9, the controller 300 may generate GUIs 40, 50, 60 of a plurality of virtual spaces corresponding to a plurality of spaces. For example, the controller 300 may generate virtual spaces 40, 50, 60 corresponding to each of the living room, bedroom, and kitchen, and may dispose an icon of an IoT device in each of the virtual spaces 40, 50, 60. The plurality of virtual spaces 40, 50, 60 may be generated as three dimensional image or two dimensional image, respectively.

The controller 300 may control the display 200 to selectively display the GUIs 40, 50, 60 of the plurality of virtual spaces in response to a user input. For example, when a user inputs a swipe operation to the display 200, the display 200 may sequentially and/or selectively display the plurality of virtual spaces 40, 50, 60. The user may select a specific virtual space and select an icon of an IoT device included in the selected virtual space.

Figure 10:
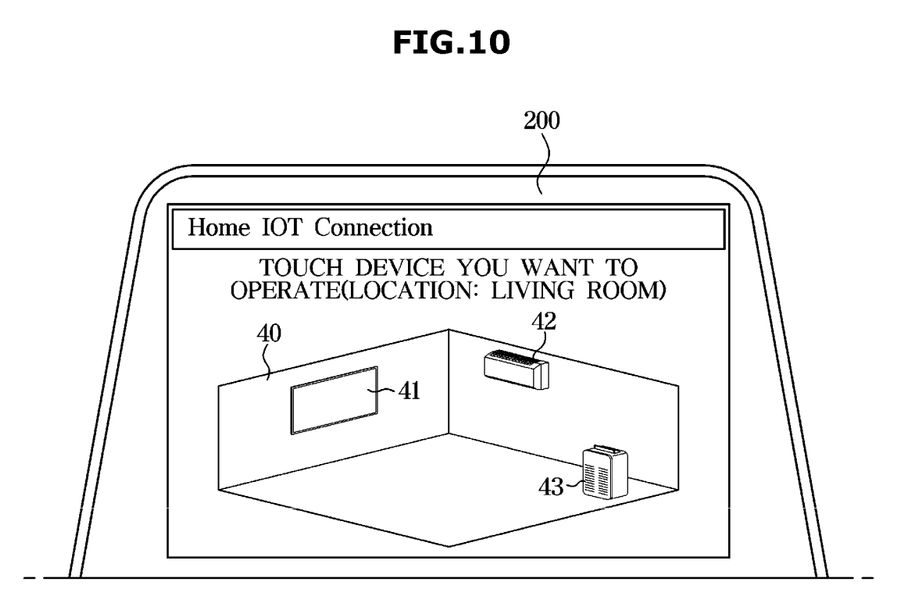
FIG. 10 illustrates that an icon of an IoT device is displayed as an actual image.

FIG. 10 illustrates that an icon of an IoT device is displayed as an actual image.

Referring to FIG. 10, the controller 300 may generate icons 41, 42, 43 of the IoT device based on actual images of the IoT devices 31, 32, 33. The actual image of the IoT devices 31, 32, 33 may be downloaded from an external device or stored in advance in the memory 320. The controller 300 identifies the IoT devices 31, 32, 33 based on the ID of the IoT devices 31, 32, 33, and may generate the icons 41, 42, 43 of the IoT device by importing an actual image corresponding to the identified IoT devices 31, 32, 33. As such, when the icons 41, 42, 43 of the IoT device are generated based on the actual images of the IoT devices 31, 32, 33, intuition may be further improved.

Figure 11:
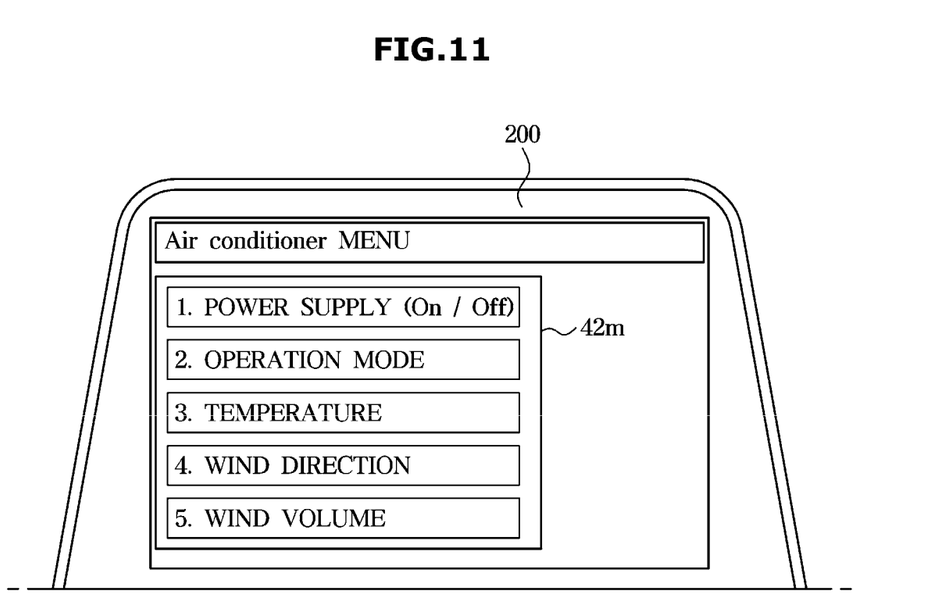
FIG. 11 illustrates a menu displayed on a display when an icon of a specific IoT device is selected.

FIG. 11 illustrates a menu displayed on a display when an icon of a specific IoT device is selected.

Referring to FIG. 11, when the user's input for selecting the icons 41, 42, 43 of the IoT device is detected, the controller 300 may control the display 200 to display a menu 42*m* related to the operation of the selected IoT device 31, 32, or 33. For example, when the user selects an icon of the air conditioner, a menu 42*m* related to the operation of the air conditioner may be displayed on the display 200. The menu 42*m* related to the operation of the air conditioner may include a power supply (On/Off), an operation mode, a temperature, a wind direction, and a wind volume.

In addition, the controller 300 may control the communication device 100 to transmit a control signal corresponding to the input of the user to the IoT devices 31, 32, 33 when the input of the user who controls the operation of the IoT devices 31, 32, 33 is detected. For example, when a user inputs to select a power on menu of the air conditioner, the power on signal of the air conditioner may be transmitted to the air conditioner.

As described above, the disclosed infotainment apparatus of the vehicle and control method thereof may improve intuition and convenience by generating a virtual space similar to the real space in which IoT devices are disposed, and generating and displaying a GUI of the virtual space on a display.

The disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An infotainment apparatus of a vehicle comprising:
   a communication device;
   a memory;
   a display;
   a controller configured to:
      receive relative location information of a plurality of internet of things (IoT) devices included in a predetermined space from an external device,
      identify a first IoT device located at a farthest distance from a relative origin coordinate among the plurality of IoT devices as a device of an icon to be located at an outermost side of a virtual space based on the relative location information of the plurality of IoT devices,
      generate the virtual space, by calculating a size of the virtual space based on relative location information of the first IoT device, predetermined size data of the first IoT device stored in the memory, and a predetermined distance between an outer line of the virtual space and an edge line of an icon of the first IoT device stored in the memory, dispose icons of the plurality of IoT devices in the virtual space, and control the display to display a Graphic User Interface (GUI) of the virtual space in which the icons are disposed.

2. The infotainment apparatus according to claim 1, wherein the controller is configured to generate at least one of the virtual space or the icons of the plurality of IoT devices as a three dimensional image or a two dimensional image.

3. The infotainment apparatus according to claim 1, wherein the controller is configured to control the display to display a menu related to an operation of a second IoT device corresponding to an icon selected among the icons based on a user input.

4. The infotainment apparatus according to claim 3, wherein the controller is further configured to control the communication device to transmit a control signal based on the user input to the second IoT device.

5. The infotainment apparatus according to claim 1, wherein, when there are a plurality of predetermined spaces, the controller is configured to generate a GUI of a plurality of virtual spaces corresponding to the plurality of predetermined spaces.

6. The infotainment apparatus according to claim 5, wherein the controller is configured to control the display to selectively display the GUI of the plurality of virtual spaces in response to a user input.

7. The infotainment apparatus according to claim 1, wherein the controller is configured to generate the icons based on actual images of the plurality of IoT devices.

8. A control method of an infotainment apparatus of a vehicle, the method comprising:

receiving relative location information of a plurality of Internet of Things (IoT) devices included in a predetermined space from an external device;

identifying a first IoT device located at a farthest distance from a relative origin coordinate among the plurality of IoT devices based as a device of an icon to be located at an outermost side of a virtual space on the relative location information of the plurality of IoT devices;

generating the virtual space, by calculating a size of the virtual space based on relative location information of the first IoT device, predetermined size data of the first IoT device, and a predetermined distance between an outer line of the virtual space and an edge line of an icon of the first IoT device;

placing icons of the plurality of IoT devices in the virtual space; and displaying a Graphic User Interface (GUI) of the virtual space in which the icons are placed.

9. The control method according to claim 8, wherein the generating a virtual space comprises generating the virtual space as a three dimensional image or a two dimensional image, and wherein the control method further comprises generating the icons as three dimensional or a two dimensional images.

10. The control method according to claim 8, further comprising displaying a menu related to an operation of a second IoT device corresponding to an icon selected based on a user input.

11. The control method according to claim 10, further comprising transmitting a control signal based on the user input to the second IoT device.

12. The control method according to claim 8, wherein the generating a GUI of the virtual space comprises, when there are a plurality of predetermined spaces, generating a GUI of a plurality of virtual spaces corresponding to the plurality of spaces.

13. The control method according to claim 12, further comprises selectively displaying the GUI of the plurality of virtual spaces in response to a user input on the display.

14. The control method according to claim 8, further comprising generating the icons based on actual images of the plurality of IoT devices.

* * * * *